(12) United States Patent
Soryal et al.

(10) Patent No.: US 12,169,551 B2
(45) Date of Patent: Dec. 17, 2024

(54) ACCESS TO CLOUD-DISTRIBUTED APPLICATIONS VIA ACCESS CREDENTIAL LOCKER SERVICE

(71) Applicant: AT&T Intellectual Property I, L.P., Atlanta, GA (US)

(72) Inventors: Joseph Soryal, Glendale, NY (US); Satyendra Tripathi, Marlboro, NJ (US); Christina Cacioppo, Freehold, NJ (US)

(73) Assignee: AT&T Intellectual Proprty I, L.P., Atlanta, GA (US)

( * ) Notice: Subject to any disclaimer, the term of this patent is extended or adjusted under 35 U.S.C. 154(b) by 331 days.

(21) Appl. No.: 17/655,090

(22) Filed: Mar. 16, 2022

(65) Prior Publication Data

US 2023/0297664 A1   Sep. 21, 2023

(51) Int. Cl.
*H04L 9/14* (2006.01)
*G06F 21/45* (2013.01)
*H04L 9/32* (2006.01)
*H04L 9/40* (2022.01)

(52) U.S. Cl.
CPC ........... *G06F 21/45* (2013.01); *H04L 9/14* (2013.01); *H04L 9/3226* (2013.01); *H04L 63/061* (2013.01); *H04L 63/083* (2013.01); *H04L 2463/082* (2013.01)

(58) Field of Classification Search
CPC ... H04L 63/061; H04L 63/067; H04L 63/083; H04L 63/0853; H04L 63/0884; H04L 2463/082; H04L 9/0816; H04L 9/085; H04L 9/14; H04L 9/3226
See application file for complete search history.

(56) References Cited

U.S. PATENT DOCUMENTS 9,374,221 B1 *   6/2016   Juels ..................... H04L 9/321
9,716,724 B1 *   7/2017   Chennuru ............. H04L 63/20
(Continued)

OTHER PUBLICATIONS

Iraca, S., "Equinix Cloud Exchange Brings New Level of Interconnection and Potential to the Cloud with Oracle Cloud", Equinix, Oct. 28, 2015, accessed from https://blog.equinix.com/blog/2015/10/28/equinix-cloud-exchange-brings-new-level-of-interconnection-and-potential-to-the-cloud-2/, 4 pages.

(Continued)

*Primary Examiner* — Eric W Shepperd

(57) ABSTRACT

A processing system may obtain a request from a user device to activate an access credential locker for use in accessing at least one enterprise system of an enterprise via the processing system, the request comprising a token that identifies the access credential locker, obtain a first key from the user device, transmit, to the enterprise, a request for a second key, obtain the second key from the enterprise in response to the request, apply the first key and the second key to the access credential locker, the access credential locker being encrypted in accordance with the first and second keys and being decrypted via the applying of the first and second keys, and establish a communication session between the user device and the at least one enterprise system via the processing system using at least one access credential that is stored in the decrypted access credential locker.

20 Claims, 3 Drawing Sheets

(56) References Cited

U.S. PATENT DOCUMENTS

| | | | | |
|---|---|---|---|---|
| 2008/0077983 | A1* | 3/2008 | Meyer | H04L 63/0815 |
| | | | | 715/234 |
| 2014/0259130 | A1* | 9/2014 | Li | G06F 21/31 |
| | | | | 726/6 |
| 2015/0039908 | A1* | 2/2015 | Lee | G06F 21/35 |
| | | | | 713/193 |
| 2017/0223024 | A1* | 8/2017 | Desai | H04L 63/20 |
| 2018/0004934 | A1* | 1/2018 | Venkataramani | H04L 9/0891 |
| 2018/0270201 | A1* | 9/2018 | Chanak | H04L 9/14 |
| 2020/0410086 | A1* | 12/2020 | Harmon | G06F 16/252 |
| 2021/0143997 | A1* | 5/2021 | Piriyath | H04L 63/0272 |

OTHER PUBLICATIONS

SAP Cloud Peering, "Connect to SAP solutions through leading interconnection providers", accessed on Feb. 3, 2022 from https://www.sap.com/services/cloud/peering-interconnection.html, 3 pages.

Singh Dagar, K, "WAN and Security Transformation is Critical to Architecting SASE", ARUBA Blog, Mar. 15, 2021, accessed from https://blogs.arubanetworks.com/solutions/wan-and-security-transformation-is-critical-to-architecting-sase, 6 pages.

Cloudflare, "What is an identity provider (IdP)?", accessed on Feb. 1, 2022 from https://www.cloudflare.com/learning/access-management/what-is-an-identity-provider/. 5 pages.

Cloudflare, "What is SASE? Secure access service edge", accessed on Feb. 1, 2022 from https://www.cloudflare.com/learning/access-management/what-is-sase/, 6 pages.

Cloudflare, "What is SSO? How single sign-on works?", accessed on Feb. 1, 2022 from https://www.cloudflare.com/learning/access-management/what-is-sso/, 6 pages.

Cloudflarie, "What is Zero Trust Network Access (ZTNA)?", accessed on Feb. 1, 2022 from https://www.cloudflare.com/learning/access-management/what-is-ztna/, 6 pages.

\* cited by examiner

ACCESS TO CLOUD-DISTRIBUTED
APPLICATIONS VIA ACCESS CREDENTIAL
LOCKER SERVICE

The present disclosure relates generally to telecommunication networks and cloud computing, and more particularly to methods, computer-readable media, and apparatuses for establishing a communication session between a user device and an enterprise system using an access credential stored in an access credential locker that is decrypted in accordance with a first key obtained from the user device and a second key obtained from the enterprise.

BACKGROUND

A software defined network (SDN) architecture for a telecommunication network may be built upon network function virtualization infrastructure (NFVI) that is capable of being directed with software and SDN protocols to perform a broad variety of network functions and services. Different locations in the telecommunication network may be provisioned with appropriate amounts of network substrate, and to the extent possible, virtual network functions (VNFs) comprising routers, switches, edge caches, middleboxes, and the like, may be instantiated from the common resource pool. These virtual network functions (VNFs), may perform the same or similar functions as the dedicated hardware counterparts. In addition to replacing or complementing traditional physical network resources with VNFs, VNFs may increasingly be deployed to different public clouds.

SUMMARY

Methods, computer-readable media, and apparatuses for establishing a communication session between a user device and an enterprise system using an access credential stored in an access credential locker that is decrypted in accordance with a first key obtained from the user device and a second key obtained from the enterprise are described. For instance, in one example, a processing system including at least one processor may obtain a request from a user device to activate an access credential locker associated with a user of the user device for use in accessing at least one enterprise system of an enterprise via the processing system, where the request comprises a token that identifies the access credential locker, obtain a first key from the user device, transmit, to the enterprise, a request for a second key, and obtain the second key from the enterprise in response to the request for the second key. The processing system may then apply the first key and the second key to the access credential locker, where the access credential locker is encrypted in accordance with the first key and the second key, and where the access credential locker is decrypted via the applying of the first key and the second key, and establish a communication session between the user device and the at least one enterprise system via the processing system using at least one access credential that is stored in the access credential locker that is decrypted.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
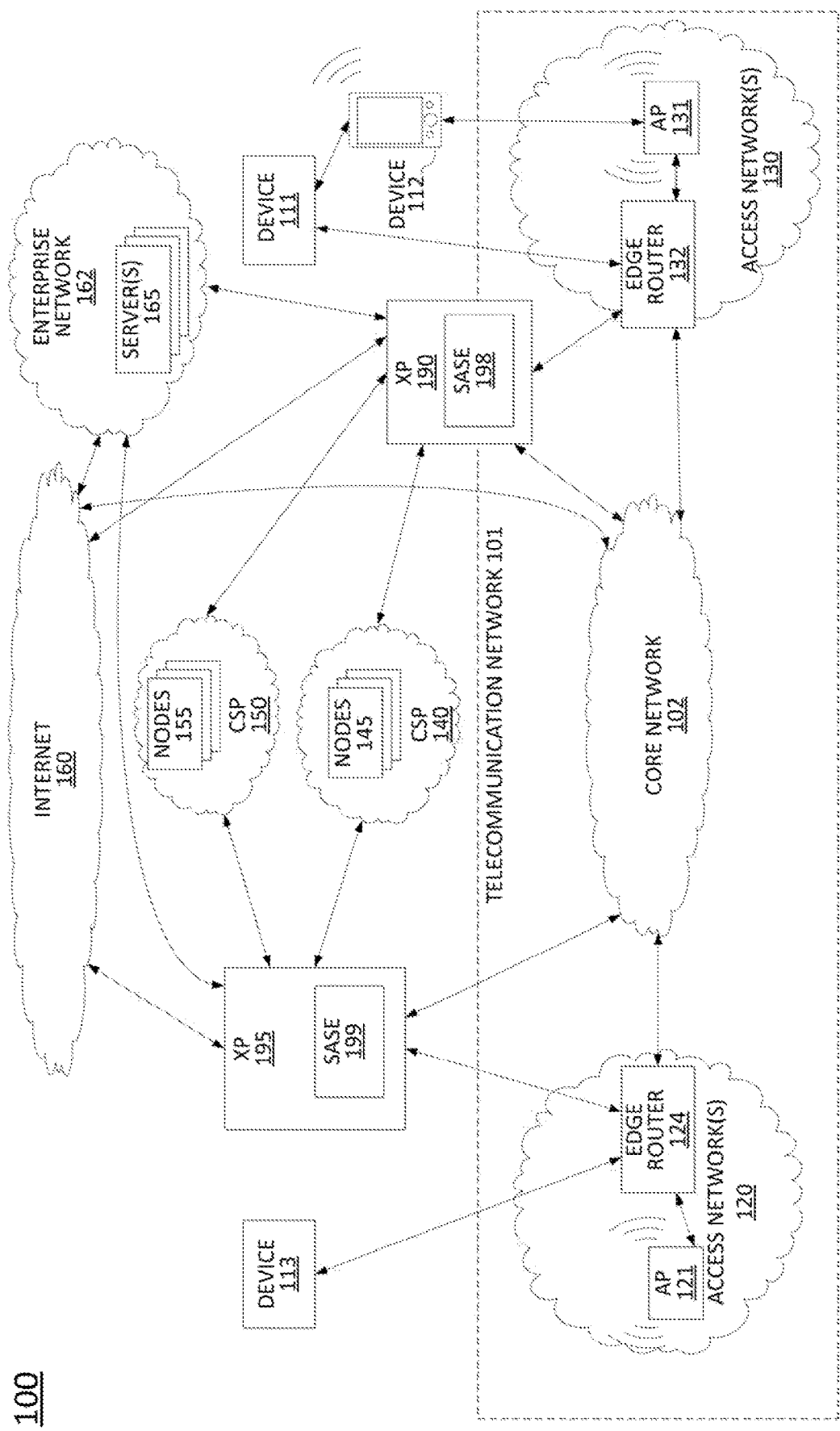
FIG. 1 illustrates an example network related to the present disclosure.

Examples of the present disclosure include methods, computer-readable media, and apparatuses for establishing a communication session between a user device and an enterprise system using an access credential stored in an access credential locker that is decrypted in accordance with a first key obtained from the user device and a second key obtained from the enterprise. Notably, end-to-end virtual private network (VPN) solutions may not meet the current and developing requirements of various enterprises. For instance, VPNs may not scale well due to a considerable amount of basic infrastructure that may be required to terminate remote connections. At the same time, enterprises may need to scale this infrastructure in a short time frame, such as overnight. For instance, due to the rise of "work from home" arrangements, enterprises may need to scale up VPN infrastructure due to unexpected situations such as severe weather, which in the past may have caused a lost work day, but now may result in workers simply choosing to work from home. In addition, many enterprise applications now reside in the cloud, as opposed to a private enterprise data center. Thus, network architects can no longer just place resources at the edge of a private data center. Moreover, VPNs may allow more user access than is warranted. For instance, a VPN may provide for unrestricted access to enterprise systems once a user has gained access to the enterprise data center via the VPN.

A secure access service edge (SASE) facilitates connecting from anywhere to applications hosted in the cloud. In particular, remote access is facilitated at an SASE point-of-presence (POP), and the user can then be steered to an enterprise system (e.g., a database, an application, etc.) directly (e.g., without having to hairpin the traffic via a VPN termination point in an enterprise data center). In one example, the present disclosure provides a zero-trust solution over SASE, while maintaining ease of access for remote workers. To illustrate, in one example, the present disclosure includes three cooperative, connected modules: a client intelligent application (CIA) residing on a user's computing device, an SASE intelligent application (SIA) residing on the SASE (e.g., a module of the SASE), and a cloud access module (CAM) residing at an enterprise edge node/firewall. In one example, the SIA may encrypt a user's access credentials and/or a user profile for all enterprise applications using two keys—one from the CIA (user) and the second from the CAM (enterprise). Accordingly, the enterprise can confirm that the user is still an employee with access privileges by providing the second key (or not).

In one example, at the beginning of a work day or other time periods, a remote user may log-in to a personal computer and run the CIA. The CIA may first verify the user's credentials, such as requiring a first password. The CIA may then generate and/or retrieve a first key and provide the first key to the SIA. In one example, the CIA may have a companion application operating on the user's mobile phone or other mobile computing devices, which may be used for two-factor authentication. For instance, a code may be generated and provided to the mobile phone, which the user may enter via the user device on which access to the enterprise system(s) is being requested. The code may be verified by the SIA. If the two-factor authentication code is correct, the SIA may then request the second key from the CAM. In one example, the SIA may provide a code to the user device and/or to the mobile phone, which may be combined with a code previously stored on the user device, and from which the first key may be derived. For instance, the first key may be generated via an XOR operation of stored code and the two-factor authentication code received from the SIA, or a similar combination operation, such as an append operation, etc. In one example, if the user is using a mobile smartphone for access (e.g., the mobile smartphone is the user device via which access is being sought), then the nearest base station may act as a second host for the CIA companion application.

In any case, upon receiving the first key, the SIA may request the second key from the CAM. If the user is still in good standing, the CAM may generate and/or retrieve the second key and provide the second key to the SIA. The SIA may then decrypt/unlock an access credential locker of the user with the two keys. The access credential locker may include a number of user access credentials for different enterprise applications (e.g., a first access credential for accessing a document management system, a second access credential for accessing a customer relationship management system, a third access credential for accessing a billing and/or procurement system, etc.). The SASE, and/or the SIA module thereof, may then obtain access to one or more enterprise systems in one or more clouds using the access credential(s) that are contained in the access credential locker that is decrypted. For instance, the SASE may establish one or more communication sessions between a user device and one or more applications in one or more clouds via the SASE. As such, the user does not need to continually enter passwords and complete verifications to gain access to different enterprise systems. In addition, all communications between the user device and the enterprise system(s) may be routed via the SASE, e.g., without first having to pass through an enterprise data center and hairpin back out to one or more clouds in which the enterprise system(s) is/are deployed.

In one example, the present disclosure also provides a zero-trust framework to provide ongoing authentication of the user, but in a non-obtrusive way. For instance, in one example, during working hours, the CIA on the user device may present the user with questions derived from a user context, such as upcoming, current, or recently completed scheduled/calendar events, weather, environment, and/or locational factors, or the like to further verify that the authorized user is still the one using the user device. The questions may be presented via a speaker or on screen, and the user may provide answers/replies verbally via a microphone or by typing via a keyboard.

Notably, most large enterprises may already have monitoring software applications running on users' (e.g., employees') computing devices. In this regard, the present disclosure may include expanded functionality in such applications and/or may provide a companion application that will similarly monitor device usage and/or other indicators of user context (such as accessing an electronic calendar of the user, accessing a weather data service to identify past, current, and/or forecast weather for a location at which the user device is expected to be located, etc.). For instance, the present disclosure may derive one or more questions from the user context which may have a defined set or range of acceptable answers/replies. For example, the user may first be presented with a question: "How are you doing today, John?." The user's name may actually be Steve, and acceptable answers/replies may be "That is not my name," "My name is Steve," "What?", "I don't understand," etc. If the user answers "Good," "Fine," "Bad," etc., then the application may determine that the user device may potentially be compromised, or may determine that the user device is more likely to be compromised—in which case, the application may continue to consider other factors, such as asking additional questions, and making a verification decision based on the multiple factors. For instance, the zero trust verification may not simply fail with the first "wrong" answer, but may trigger secondary authentications in consideration that the remote workers may casually answer the challenge questions and may simply be mistaken or distracted, may fail to remember, and so forth. Further questions may include "How was your meeting?," "What time was your meeting," and so forth. Acceptable answers may be "Good," "Fine," "Bad," etc. (e.g., if there was an actual meeting), or "I did not have a meeting?" (e.g., there was no meeting on the user calendar and the question was a trick question). As such, the present disclosure may provide a minimally intrusive framework for zero-trust, ongoing authentication. These and other aspects of the present disclosure are described in greater detail below in connection with the examples of FIGS. 1-3.

To aid in understanding the present disclosure, FIG. 1 illustrates an example system 100 in which examples of the present disclosure for establishing a communication session between a user device and an enterprise system using an access credential stored in an access credential locker that is decrypted in accordance with a first key obtained from the user device and a second key obtained from the enterprise may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may include a telecommunication network 101. The telecommunication network 101 may comprise a core network 102. The core network 102 may be in communication with one or more access networks 120 and 130, and the internet 160. In one example, core network 102 may combine core network components of a cellular network with components of a triple play service network; where triple-play services include telephone services, Internet services and television services to subscribers. For example, core network 102 may functionally comprise a fixed mobile convergence (FMC) network, e.g., an IP Multimedia Subsystem (IMS) network. In addition, core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 102 may further comprise a broadcast television network, e.g., a traditional cable provider network or an Internet Protocol Television (IPTV) network, as well as an Internet Service Provider (ISP) network. In one example, core network 102 may include a plurality of television (TV) servers (e.g., a broadcast server, a cable head-end), a plurality of content servers, an advertising server (AS), an interactive TV/video on demand (VoD) server, and so forth. For ease of illustration, various additional elements of network 102 are omitted from FIG. 1.

In one example, the access networks 120 and 130 may comprise cellular/wireless access networks, e.g., radio access networks (RANs), such as a Universal Terrestrial Radio Access Network (UTRAN), an evolved UTRAN (eUTRAN), or the like. In such an example, the system 100 may comprise an LTE network, and the core network 102 may comprise an Evolved Packet Core (EPC) network, for instance. However, in other, further, and different examples, any one or more of access networks 120 and 130 may alternatively or additional comprise a Digital Subscriber Line (DSL) network, a broadband cable access network, a (non-cellular) wireless access networks (e.g., an Institute for Electrical and Electronics Engineers (IEEE) 802.11/Wi-Fi network and the like), and so forth. For example, the operator of telecommunication network 101 may provide a cable television service, an IPTV service, or any other types of telecommunication services to subscribers via the telecommunication network 101.

In one example, the access networks 120 and 130 may be in communication with one or more devices 111-113, e.g., endpoint devices, user devices, or user equipment (UE). Access networks 120 and 130 may transmit and receive communications between devices 111-113, between devices 111-113 and components of core network 102, between devices 111-113 and components of cloud service providers (CSPs) 140 and 150, devices reachable via the internet 160 in general, and so forth. For instance, as illustrated in FIG. 1, each of the access networks 120 and 130 may include at least one access point (AP), e.g., AP 121 and AP 131, that may communicate wirelessly with devices 111-113 and that may interface with other devices in the respective access networks 120 and 130, in the core network 102, over the internet 160 in general, and so on. Each of the APs 121 and 131 may comprise a cellular base station, such as a base transceiver station (BTS), a NodeB or an evolved NodeB (eNodeB or eNB), a pico eNB (PeNB), e.g., of a pico cell, a home eNB (HeNB), e.g., of a femto cell, a non-cellular AP, e.g., a IEEE 802.11 wireless router/AP, and so on. Alternatively, or in addition, access networks 120 and 130 may include edge routers (e.g., edge routers 124 and 132), such as provide edge (PE) routers, which may comprise ingress points to telecommunication network 101. In this regard, it should be noted that there may be other networking equipment and intermediate connections omitted from illustration in FIG. 1, such as a customer edge (CE) router, a residential broadband gateway, an optical network unit (ONU), or the like between various user equipment (such as devices 111 and 113) and edge routers 124, 132, etc.

In one example, each of the devices 111-113 may comprise any single device or combination of devices that may comprise a user endpoint device, or client device. For example, the devices 111-113 may each comprise a mobile device, a cellular smart phone, a laptop, a tablet computer, a desktop computer, or the like the like. In one example, devices 111-113 may each comprise programs, logic, or instructions for performing functions in connection with examples of the present disclosure for establishing a communication session between a user device and an enterprise system using an access credential stored in an access credential locker that is decrypted in accordance with a first key obtained from the user device and a second key obtained from the enterprise. For example, devices 111-113 may each comprise a computing system or device, such as computing system 300 depicted in FIG. 3, and may be configured to provide one or more operations or functions in connection with the example method 200, as described herein.

As further illustrated in FIG. 1, the system 100 includes the internet 160 and cloud service providers (CSPs) 140 and 150. CSPs 140 and 150 may comprise networked computing resources for providing cloud services directly on behalf of the CSPs 140 and 150 and/or for third parties having applications hosted via CSP 140 and/or CSP 150. For instance, CSP 140 and CSP 150 may comprise public or private cloud computing resources in one or more data centers, such as central processing units (CPUs), graphics processing units (GPUs), programmable logic devices (PLDs), such as field programmable gate arrays (FPGAs), or the like, memory devices, storage devices, and so forth. The computing resources may operate as servers for hosting virtual machines (VMs), containers, microservices, or the like, or for providing various applications, and/or may operate as storage systems for storing databases, data tables, graphs, and so on. As such, each of CSPs 140 and 150 may include a plurality of nodes, e.g., nodes 145 and 155. The nodes 145 and 155 may comprise host devices, e.g., computing resources comprising processors, e.g., CPUs, GPUs, PLDs, memory, storage, and so forth. In addition, the nodes 145 and 155 may be configured to interact with other computing resources external to the respective CSPs 140 and 150, such as with endpoint devices/UE, such as devices 111-113, in connection with the client service(s) instantiated thereon. For instance, the nodes 145 and 155 may operate as various enterprise systems, such as document management system servers, billing system servers, customer relationship management system servers, and so on.

As illustrated in FIG. 1, the system 100 further includes exchange points (XPs) 190 and 195, e.g., Internet exchange points (IXPs) and/or edge exchange points (EXPs) (e.g., providing the same or similar functions and having the same or similar components as an IXP, but at a more limited scale and with greater proximity between the telecommunication network and cloud service provider infrastructure, and with greater proximity to end user's devices, e.g., devices 111-113 in the example of FIG. 1). In accordance with the present disclosure an XP may interconnect one or more telecommunication networks and one or more cloud service providers. For instance, XPs 190 and 195 may interconnect telecommunication network 101, cloud service provider (CSP) 140, and CSP 150. The XPs 190 and 195 may utilize routing protocols, such as Border Gateway Protocol (BGP) to exchange routes for specific IP addresses with cloud service providers, or the like.

In accordance with the present disclosure, an XP may be provided by a telecommunication network, or may be provided by a third party. Thus, for example, XP 190 may be provided by telecommunication network 101 and may be a component of one of access networks 130 and/or of the telecommunication network 101 in general. For illustrative purposes, XP 195 may be deployed and operated by a third party (e.g., not the telecommunication network 101, CSP 140, or CSP 150). In one example, XPs 190 and 195 may each include a computing system or server, such as computing system 300 depicted in FIG. 3, or a hardware switch based upon an application specific integrated circuit (ASIC) or programmable logic device (PLD) to route data, e.g., packets, between and among telecommunication network 101, CSPs 140 and 150, the internet 160, and so forth.

In accordance with the present disclosure, XPs 190 and 195 may each include, or be co-located and in communication with a respective secure access service edge (SASE) 198 or 199 (or "SASE unit"). In particular, each SASE 198 and 199 may comprise a processing system configured to provide one or more operations or functions for establishing a communication session between a user device and an enterprise system using an access credential stored in an access credential locker that is decrypted in accordance with a first key obtained from the user device and a second key obtained from the enterprise, as described herein (e.g., in accordance with the example method 200).

Figure 3:
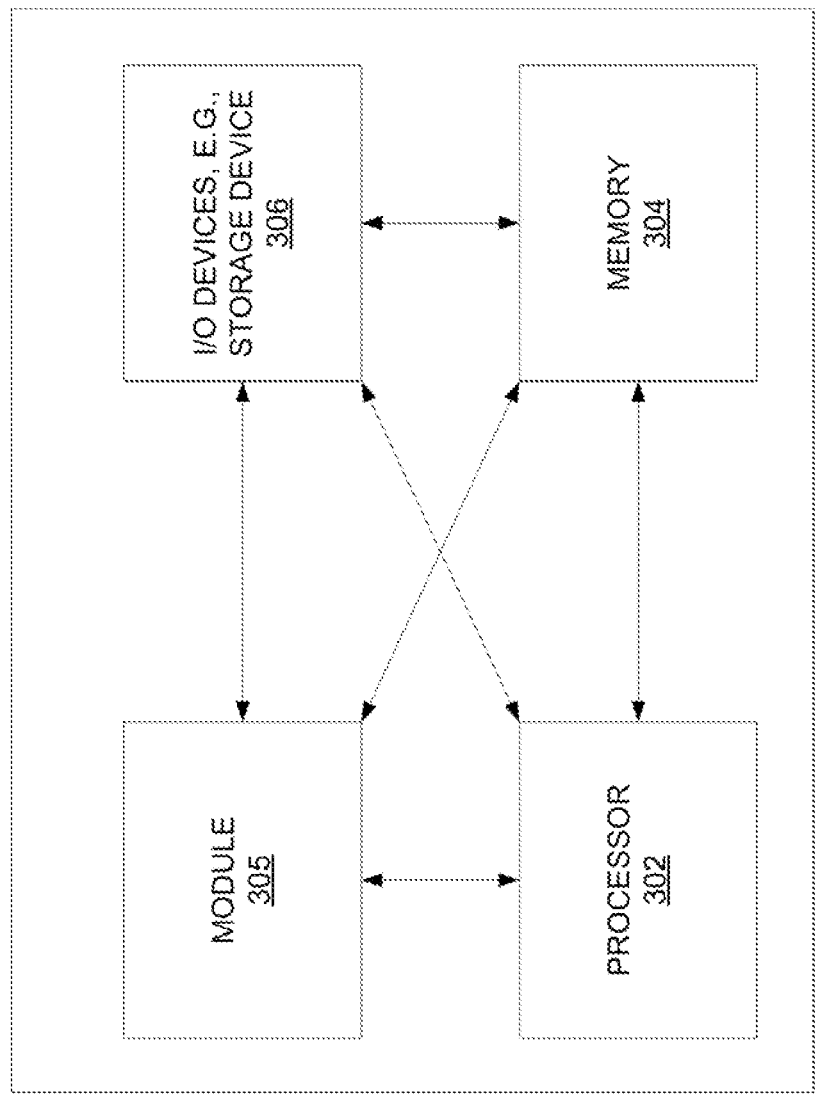
FIG. 3 illustrates a high level block diagram of a computing device specifically programmed to perform the steps, functions, blocks and/or operations described herein.

It should also be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

As further illustrated in FIG. 1, the system 100 may include an enterprise network 162, which may comprise a plurality of server(s) 165. For instance, server(s) 165 may represent and may comprise one or more enterprise systems, e.g., document management system servers, billing system servers, customer relationship management system servers, procurement system servers, and so on. In accordance with the present disclosure, the enterprise network 162 may comprise on-premises equipment of an enterprise (e.g., a business organization, an educational organization, a governmental entity, etc.). Although only a single enterprise network 162 is illustrated in FIG. 1, it should be noted that an enterprise may have multiple on-premises networks distributed at various locations of the enterprise, which may be interconnected in accordance with a virtual local area network (VLAN) implementation, permanent virtual circuit (PVC) implementation, or the like. In addition, the enterprise associated with enterprise network 162 may deploy various computing resources (e.g., enterprise systems) supporting the enterprise operations to various cloud service providers (e.g., CSP 140 and/or CSP 150), as noted above.

In an illustrative example, the enterprise may have remote users (e.g., employees or other authorized persons) who need to gain access to various computing systems/computing resources of the enterprise (broadly "enterprise systems"), which may be deployed on cloud computing infrastructure of one or both of CSPs 140 and 150 (e.g., nodes 145 and/or nodes 155) and/or on-premises (e.g., at one or more of servers 165 of enterprise network 162). For illustrative purposes, a user may be using device 111 to seek to gain access to one or more of the enterprise computing resources. For instance, the user device 111 may comprise a laptop computer with network connectivity via the user home broadband internet access. In this case, the user's home networking equipment may be in communication with telecommunication network 101 via edge router 132 of access network(s) 130, and may provide connectivity for device 111. In addition, the user may possess a mobile smartphone (e.g., device 112), which for illustrative purposes, may be in communication with telecommunication network 101 via AP 131 of access network(s) 130 (e.g., a cellular base station).

In accordance with the present disclosure, all access or attempted access by remote users to computing resources of the enterprise may be regulated and facilitated via secure access service edges (SASEs). Continuing with the present example, the user may thus attempt to access one or more computing resources of the enterprise via device 111. As such, device 111 may establish a communication with SASE 198 to seek such access. For instance, SASE 198 may store and/or may retrieve an access credential locker associated with the user (e.g., where each user associated with the enterprise may have a respective access credential locker). In the present example, SASE 198 may be an SASE that is most local to the device 111, e.g., in terms of geographic distance, network distance, network latency, etc., and that is therefore assigned to service the device 111. To illustrate, in one example, the device 111 may comprise a client intelligent application (CIA) installed and in operation thereon. In addition, SASE 198 may comprise a SASE intelligent application (SIA) (e.g., a module of the SASE). In one example, SASE 198 (e.g., via the SIA) may encrypt and decrypt a user's access credentials and/or a user profile for all enterprise applications using two keys—one from the CIA (user) and the second from enterprise network 162 (e.g., a cloud access module (CAM) thereof, which in one example may be represented by one of the server(s) 165).

Continuing with the present example, the user may log-in to device 111 and run the CIA. Device 111 (e.g., via the CIA) may first verify the user's credentials, such as requiring a first password. The device 111 may then generate and/or retrieve a first key (e.g., via the CIA) and provide the first key to the SASE 198 (e.g., to the SIA thereof). In one example, a companion application may operate on device 112 (e.g., the user's mobile smartphone), which may be used for two-factor authentication. For instance, a code may be generated by SASE 198 and provided to device 112, which the user may enter via the device 111. The code may be verified by the SIA of SASE 198. If the two-factor authentication code is correct, the SIA of SASE 198 may then request the second key from the enterprise network 162 (e.g., from a CAM thereof). In another example, the SIA of SASE 198 may provide a code to device 111 and/or to device 112, which may be combined with a code previously stored on the device 111, and from which the first key may be derived. For instance, the first key may be generated via an XOR operation of stored code and the two-factor authentication code received from SASE 198, or a similar combination operation, such as an append operation, etc. In any case, upon receiving the first key, the SASE 198 may request the second key from the enterprise network. For instance, if the user is still in good standing with the enterprise, a CAM of enterprise network 162 may generate and/or retrieve the second key, and provide the second key to SASE 198. SASE 198 may then decrypt/unlock an access credential locker of the user with the two keys.

The access credential locker may include a number of user access credentials for different enterprise systems/applications (e.g., a first access credential for accessing a document management system, a second access credential for accessing a customer relationship management system, etc.). The SASE 198, may then obtain access to one or more enterprise systems in one or more clouds using the access credential(s) that are contained in the access credential locker that is decrypted. For instance, SASE 198 may establish one or more communication sessions between device 111 and nodes 145 and/or nodes 155 via the SASE. In one example, the user may indicate one or more enterprise systems for which access is desired in connection with an initial request (e.g., a first daily access request). Alternatively, or in addition, the user may first establish access to the access credential locker via SASE 198. Subsequently, the user may then seek to access specific enterprise services on CSP 140, CSP 150, etc. via additional access requests. SASE 198 may then retrieve respective access credentials from the open/decrypted access credential locker and may establish communication sessions between device 111 and the respective enterprise systems hosted on nodes 145, nodes 155, etc. It should again be noted that the user does not need to continually enter passwords and complete verifications to gain access to different enterprise systems hosted by nodes 145 and/or nodes 155 (as well as those that may be hosted on-premises by servers 165). In addition, all communications between the device 111 and the enterprise system(s) may be routed via the SASE 198, e.g., without first having to pass through the enterprise network 160 and hairpin back out to one or more of CSPs 140 and 150 in which the enterprise system(s) is/are deployed.

In one example, device 111 may also provide ongoing authentication of the user, in a non-obtrusive way. For instance, in one example, during working hours, the CIA on device 111 may present the user with questions derived from a user context, such as upcoming, current, or recently completed scheduled/calendar events, weather, environment, and/or locational factors, or the like to further verify that the authorized user is still the one using the user device. The questions may be presented via a speaker or on screen, and the user may provide answers/replies verbally via a microphone or by typing via a keyboard. The user context may be from user data that is maintained on device 111, user data from a cloud desktop of the user, user data from device 112, and so forth. In one example, the user context may include data that device 111 obtains from a remote source, such as a weather data service, a traffic data service, or the like.

Thus, for instance, device 111 may access an electronic calendar of the user, access a weather data service to identify past, current, and/or forecast weather for a location at which the device 111 is expected to be located, etc. Device 111 (e.g., via the CIA thereof) may derive one or more questions from the user context which may have a defined set or range of acceptable answers/replies, such as described above. In the event that one or more answers are incorrect and/or unacceptable (as defined for the question), device 111 may determine that the device 111 is potentially compromised (or may determine that the device 111 is more likely to be compromised—in which case, the CIA may continue to consider other factors, such as asking additional questions, and making a verification decision based on the multiple factors). The CIA of device 111 may report unacceptable answers and/or may report positive determinations of compromise or likely compromise to SASE 198 and/or to the enterprise network 162. SASE 198 and/or enterprise network 162 may then implement any number of automated actions, such as closing connections between device 111 and enterprise system, locking/encrypting the access credential locker, etc. In one example, notifications may be transmitted to authorized personnel of enterprise network 162, who may similarly implement one or more actions, such as indicating to SASE 198 that access to the user via device 111 should be shut-down, calling the user (e.g., at device 112) to inquire and to consider if anything seems to be out of the ordinary (such as if the caller is familiar with the user's voice and the voice that answers is not the user's, etc.). As such, the present disclosure may provide a minimally intrusive framework for zero-trust, ongoing authentication.

At the end of the daily work session or other time periods, the user may indicate to SASE 198 (e.g., the SIA thereof) via the device 111 (e.g., via the CIA thereof) that any open communication session(s) with one or more enterprise systems at nodes 145, nodes 155, etc. should be ended and that the access credential locker should be encrypted/locked. Alternatively, or in addition, the device 111 and/or the SASE 198 may determine that a time period is expired for which access to enterprise systems is permitted, and may initiate termination of any open sessions, initiate the encrypting of the access credential locker, etc. Similarly, the enterprise network 162 may initiate the same procedure by notification to the SASE 198 (e.g., the SIA module thereof). For instance, such notification may be sent by a CAM thereof, or from an authorized user, such as an information technology supervisor who has received instructions to restrict the access of the user via device 111 to one or more enterprise systems.

In any case, the SASE 198 may encrypt the user's access credential locker using two keys, one for the user and the other for the enterprise. In one example, the SASE 198 may generate the keys (e.g., via a key generation algorithm), may encrypt the access credential locker using the two keys, and may provide the respective keys to the device 111 and to the CAM of the enterprise network 162. In another example, the device 111 and the CAM of the enterprise network 162 may generate respective keys and may provide the keys to the SASE 198 (e.g., the CIA thereof) to encrypt the access credential locker. In one example, SASE 198 may store the encrypted access credential locker locally (e.g., on the SASE 198 and/or another server for distributed storage platform of XP 190). In addition, in one example, the SASE 198 may provide a token to the device 111 that identifies the access credential locker and the storage location (e.g., a server name and/or IP address, or the like), and may include additional information, such as a size of the access credential locker, an IP address of the user device at a time when the access credential locker was last encrypted/locked, an identity of the SASE and/or SIA that performed the encryption/locking (e.g., SASE 198), etc. In one example, SASE 198 may not store the keys locally. In other words, the keys may be released from memory, overwritten, etc. as soon as practicable after the encrypting (and in one example after the sending of the keys to the user and the enterprise respectively).

In any case, the user may utilize the user key via device 111 for a subsequent work-day session (or for access for a similar such time period) in a similar manner as described above via SASE 198 or another SASE, such as SASE 199. As an example, the user may move to a different location, such as traveling for a work conference, and may seek to access enterprise systems via device 111 and a hotel network, which may interface to edge router 124 in access network(s) 120. For instance, device 111 (e.g., via the CIA thereof) may provide the token/receipt to SASE 199 indicating the user's intention to access enterprise systems for a new work-day session. In addition, the device 111 may provide the user key to SASE 199 for decrypting the access credential locker associated with the user (in conjunction with the enterprise key). Alternatively, the CIA of device 111 may verify the user's credentials (e.g., an initial username and password, for instance), and request a two-factor authentication code be sent to device 112.

Notably, the access credential locker may still be stored at SASE 198 and/or XP 190. As such, the SASE 199 may, using the token provide by device 111, retrieve the access credential locker from SASE 198 and/or XP 190. For instance, SASE 199 may request the access credential locker from SASE 198 (which may be identified in the token data), which may transmit SASE 198 and/or XP 190 in response. SASE 199 may then continue to request the second key from the enterprise network 162, decrypt the access credential locker using both the user key and the enterprise key, obtain access to one or more enterprise systems using the access credential(s) stored therein, and so on.

It should be noted that the system 100 has been simplified. Thus, the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like, additional access networks, and so forth.

In addition, the foregoing describes an example in which a user is accessing enterprise systems via a user device, such as a laptop computer, with additional user verification via a mobile smartphone. However, it should be noted that in another example, the user may use a mobile smartphone (e.g., device 112) for accessing the enterprise systems. In such case, in one example, the nearest base station may act as a host for a CIA companion application, e.g., for two-factor authentication and/or additional verification of the user's device 112 (e.g., the base station may vouch that the device 112 is a trusted device, that the subscriber identify module (SIM) is authentic and not suspected of being duplicated, etc.). Thus, these and other modifications are all contemplated within the scope of the present disclosure.

Figure 2:
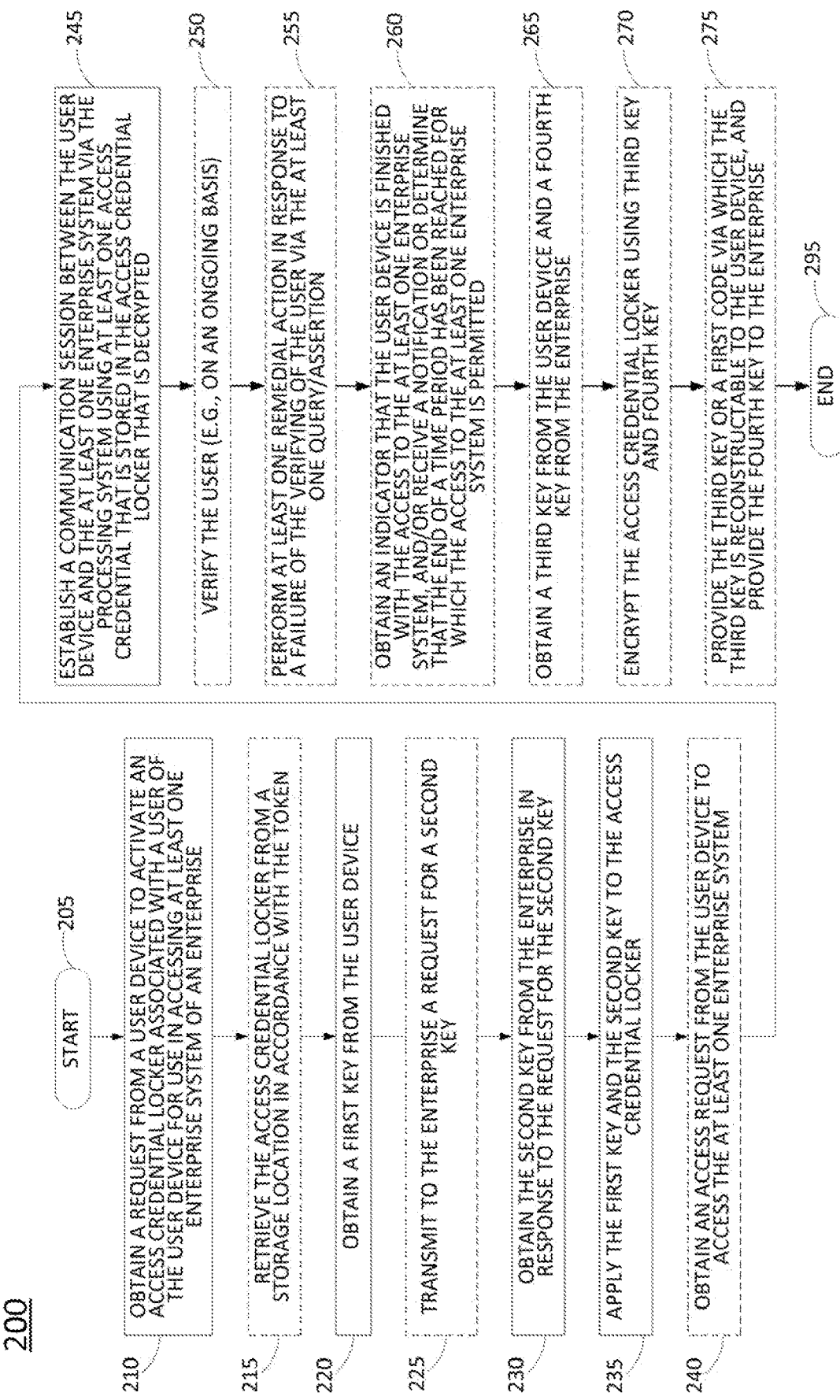
FIG. 2 illustrates a flowchart of an example method for establishing a communication session between a user device and an enterprise system using an access credential stored in an access credential locker that is decrypted in accordance with a first key obtained from the user device and a second key obtained from the enterprise.

FIG. 2 illustrates a flowchart of an example method 200 for establishing a communication session between a user device and an enterprise system using an access credential stored in an access credential locker that is decrypted in accordance with a first key obtained from the user device and a second key obtained from the enterprise, in accordance with the present disclosure. In one example, the method 200 is performed by a component of the system 100 of FIG. 1, such as by one of the SASE 198, SASE 199, XP 190, XP 195, etc., or one or more components thereof (e.g., a processor, or processors, performing operations stored in and loaded from a memory), or by one of the SASEs and/or XPs in conjunction with one or more other devices, such as one or more of nodes 145 and 155, servers 165 (e.g., a CAM of enterprise network 162) and so forth. In one example, the steps, functions, or operations of method 200 may be performed by a computing device or system 300, and/or processor 302 as described in connection with FIG. 3 below. For instance, the computing device or system 300 may represent any one or more components of an XP and/or SASE in FIG. 1 that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 300 may collectively function as a processing system. For illustrative purposes, the method 200 is described in greater detail below in connection with an example performed by a processing system. The method 200 begins in step 205 and proceeds to step 210.

At step 210, the processing system obtains a request from a user device to activate an access credential locker associated with a user of the user device for use in accessing at least one enterprise system of an enterprise via the processing system. In one example, the request may comprise a token that identifies the access credential locker. In one example, the processing system may comprise infrastructure of a cloud computing service provider network (e.g., "first infrastructure"), such as nodes 145 and/or nodes 155 of CSP 140 and/or 150 of FIG. 1, infrastructure of an Internet exchange point (IXP) (e.g., "second infrastructure"), which may include an edge exchange point (EXP), or a secure access service edge (SASE), such as described above.

It should be noted that although the terms, "first," "second," "third," etc., may be used herein, the use of these terms are intended as labels only. Thus, the use of a term such as "third" in one example does not necessarily imply that the example must in every case include a "first" and/or a "second" of a similar item. In other words, the use of the terms "first," "second," "third," and "fourth," does not necessarily imply a particular number of those items corresponding to those numerical values. In addition, the use of the term "third" for example, does not imply a specific sequence or temporal relationship with respect to a "first" and/or a "second" of a particular type of item, unless otherwise indicated.

At optional step 215, the processing system may retrieve the access credential locker from a storage location in accordance with the token. For instance, the token may identify the storage location, may include additional information, such as a size of the access credential locker, an IP address of the user device at a time when the access credential locker was last encrypted/locked, an identity of the SASE and/or SIA that performed the encryption/locking, and so forth. In this regard, it should be noted that the processing system may comprise one of a plurality of processing systems for providing user devices access to the enterprise systems via access credentials stored in access credential lockers. For instance, the processing system performing the method 200 may be designated for a first region, at least one other processing system may be designated for a second region, and so on.

At step 220, the processing system obtains a first key from the user device. In one example, the first key is generated from a first application and a second application associated with the user device. For instance, the first application may operate on the user device (e.g., a CIA, such as described above), and the second application may operate on a companion device, such as a mobile smartphone or the like. In one example, the user device may utilize a first code, e.g., a first partial key, which may be combined with a second code (e.g., as second partial key) to generate the first key, such as via an append/add operation, an XOR operation, or the like. For instance, the second partial key may be provided by the processing system to a companion device of the user as part of a two-factor authentication process, where the user may then enter the second partial key on the user device via which access to the one or more enterprise systems is being sought. Thus, in one example, step 220 may include transmitting the second code to the user device, via which the user device may generate the first key (e.g., in conjunction with a first code that is already possessed by the user device).

At step 225, the processing system transmits to the enterprise (e.g., to a computing system/processing system of the enterprise) a request for a second key (e.g., in response to obtaining of the request and/or in response to obtaining the first key). For instance, the request for the second key may include an identification of at least one of: the user or the user device.

At step 230, the processing system obtains the second key from the enterprise in response to the request for the second key. For instance, the computing system of the enterprise may provide the second key when the at least one of the user or the user device is authorized to use the at least one access credential (and/or when the user is authorized to access the access credential locker or authorized to access the at least one enterprise system). Conversely, if the user is no longer in good standing with the enterprise, or the enterprise otherwise determine that the user should not be granted access to the one or more enterprise systems, the enterprise may decline to provide the second key, or may provide an incorrect second key that may present the access credential locker from being properly decrypted.

At step 235, the processing system applies the first key and the second key to the access credential locker, where the access credential locker is encrypted in accordance with the first key and the second key, and where the access credential locker is decrypted via the applying of the first key and the second key. As discussed above, the access credential locker may store a plurality of access credentials (e.g., passwords, username-password combinations, or the like) for accessing a plurality of different enterprise systems of the enterprise, e.g., where each enterprise system is accessed via a respective one of the plurality of access credentials.

At optional step 240, the processing system may obtain an access request from the user device to access the at least one enterprise system. For instance, in one example, the request to access a specific enterprise system may be separate from the request to open the locker, which may then be used on-demand after decryption (e.g., for the duration of the day or other time periods, or until the user or the enterprise provides an indication that the locker should be closed/encrypted).

At step 245, the processing system establish a communication session between the user device and the at least one enterprise system via the processing system using at least one access credential that is stored in the access credential locker that is decrypted. In one example, the at least one enterprise system may be deployed on the infrastructure of at least one cloud computing service provider network. In one example, the at least one enterprise system may comprise a plurality of enterprise systems of the enterprise deployed on a plurality of infrastructures of a plurality of cloud computing service provider networks. In one example, step 245 may alternatively or additionally include establishing one or more communication sessions to one or more enterprise systems within the enterprise network itself (e.g., on-premises systems that are not hosted "in the cloud").

In one example, the establishing of the communication session between the user device and the at least one enterprise system is responsive to the access request that may be received at optional step 240. In one example, step 245 may comprise establishing a plurality of communication sessions between the user device and the plurality of enterprise systems using (each of) the plurality of access credentials. In one example, the at least one enterprise system may be deployed on the infrastructure of the first cloud computing service provider network (e.g., "third infrastructure"), infrastructure of a second cloud computing service provider network (e.g., "fourth infrastructure"), or infrastructure of an enterprise network of the enterprise (e.g., "fifth infrastructure").

At optional step 250, the processing system may verify the user. In one example, the verifying of optional step 250 may be via at least one assertion presented via the user device in accordance with a user context. For instance, the assertion may pertain to the user context, and may have a defined set of acceptable responses. As described above, the user context may comprise an environmental factor from where the user device is expected to be located, a weather condition where the user device is expected to be located, a scheduled event from a calendar of the user, or the like. In one example, the assertion may present a false statement and each of the defined set of acceptable responses may comprise a refutation of the false statement. For example, an assertion may be "don't forget your umbrella when you leave the building." Where the weather is sunny, an acceptable response may include: "but it's not raining," "what?," "is it supposed to rain?", etc. Where the weather is rainy or is forecast to be rainy, an acceptable response may be: "thank you," "is it supposed to rain later?," "OK," etc. Alternatively, or in addition, the at least one assertion may comprise at least one query, such as "how was your meeting?." If there was a meeting, acceptable responses may include: "good," "bad," "so so," etc. If there was not a meeting, acceptable responses may include: "what meeting?," "huh?," "I didn't have a meeting," "your question makes no sense," etc. In one example, the verifying of the user via the user device may be performed on an ongoing basis via a plurality of queries/assertions. In one example, optional step 250 may alternatively or additionally include other ways of ongoing verification, such as requiring a user to provide a biometric input (e.g., a fingerprint scan, retina scan, etc.), requiring a user to enter a time-sensitive passcode such as a passcode provided to a companion device of the user (e.g., a mobile smartphone), and so forth.

At optional step 255, the processing system may perform at least one remedial action in response to a failure of the verifying of the user via the at least one query/assertion. For instance, a report of unacceptable answers may be provided to the enterprise, the processing system may close connections between the user device and one or more enterprise systems, the processing system may lock/encrypt the access credential locker, etc. In one example, notifications may be transmitted to authorized personnel of the enterprise, who may similarly implement one or more actions, such as indicating that access to the user via the user device should be shut-down, calling the user to inquire and to consider if anything seems to be out of the ordinary, and so on.

At optional step 260, the processing system may obtain an indicator that the user device is finished with the access to the at least one enterprise system, and/or may receive a notification (e.g., from the enterprise) or determine that the end of a time period has been reached for which the access to the at least one enterprise system is permitted.

At optional step 265, the processing system may obtain a third key from the user device and obtain a fourth key from the enterprise. For instance, in one example, the user device and enterprise independently generate keys for encrypting the access credential locker (and for subsequently decrypting the access credential locker), which may be provided to the processing system. In one example, the keys may be obtained in response to a request from the processing system to the user device and the enterprise to provide such keys. In another example, the keys may be provided independently. For instance, the user device and the enterprise may both track a time period for which the access to the at least one enterprise system is permitted. When the time expires, the two entities may then automatically generate and send the respective keys.

At optional step 270, the processing system may encrypt the access credential locker using a third key and a fourth key. In one example, the third key and the fourth key may be received at optional step 265. However, in another example, the processing system may generate the keys locally and use the keys for the encrypting of optional step 270. In one example, optional step 270 may be performed in response to the obtaining of the indicator and/or the receiving of the notification at optional step 260.

At optional step 275, the processing system may provide the third key or a first code via which the third key is reconstructable to the user device, and may provide the fourth key to the enterprise. For instance, optional step 275 may be performed when the processing system locally generates the keys (e.g., and where optional step 265 is omitted). As such, the user device may regain access to the access credential locker, such as on the next work-day, or the like, using the third key (e.g., where the enterprise determines to also provide the fourth key in response to a request from the processing system, or another processing system performing similar operations with respect to another area where the user may be located, such as when the user is traveling). In one example, the first code may be a first partial key, which may be combined with a second partial key (or "second code") to generate the third key, such as via an append/add operation, an XOR operation, or the like. For instance, the second code may be provided by the processing system (or other processing system providing similar operations for a different area) to a companion device of the user as part of a two-factor authentication process, where the user may then enter the second code on the user device via which access to the one or more enterprise systems is being sought. In one example, the processing system does not retain the keys locally (e.g., if held in memory, the memory may be overwritten as soon as practicable after the encrypting of the locker and/or after the transmitting of the keys to the user device and enterprise).

Following step 245 or any one or more of optional steps 250-275 the method 200 proceeds to step 295 where the method ends.

It should be noted that the method 200 may be expanded to include additional steps, or may be modified to replace steps with different steps, to combine steps, to omit steps, to perform steps in a different order, and so forth. For instance, in one example the processing system may repeat one or more steps of the method 200, such as steps 210-245 for subsequent access requests from the same user device (e.g., for a next work-day or other time period for which access is being sought), steps 210-275, and so forth. In another example, a request to access at least one specific enterprise system may trigger the process of obtaining keys and decrypting the access credential locker for retrieval of access credential(s). In one example, the first key may be obtained as part of the request at step 210. In other words, step 220 may be combined with step 210. In one example, the method 200 may further include prompting the user or user device for the first key. In one example, step 220 may precede step 215. In one example, the method 200 may be expanded or modified to include steps, functions, and/or operations, or other features described above in connection with the example(s) of FIG. 1, or as described elsewhere herein.

In other examples, the present disclosure may include parallel methods performed by a user device and a computing system/processing system of an enterprise. For example, a user device may obtain a user input to being accessing one or more enterprise systems (e.g., at the beginning of a work day), may provide a token to an SASE (and/or an SIA module thereof) that identifies an access credential locker of the user, may obtain an input of a second code (e.g., as discussed above), may generate the first key from a first code and the second code, may transmit the key to an SASE, SIA module thereof, or the like, may perform operations to establish communication sessions with one or more enterprise systems via the SASE, may perform an ongoing user verification process as part of a zero-trust framework, may notify the SASE and/or SIA module of a completion of a work day, may receive a token identifying the access credential locker, may receive a subsequent user key for use the following day or other time period or a partial key/code that may be used to derive the user key, and so forth. Similarly, a processing system of an enterprise may receive and store enterprise keys for one or more users, may receive requests from SASEs and/or SIA modules thereof to provide the second keys in connection with user requests for access to enterprise systems, may make decisions whether to provide such keys or not (e.g., if a user is in good standing or if a user account has been flagged for revocation of access, temporary revocation of access (e.g., until the user updates one or more passwords, adds or changes authentication challenge questions, re-verifies biometric data in-person, etc.)), may generate and provide new enterprise keys upon request from SASEs/SIAs, when time periods for permitted access have expired, and so on. Thus, these and other modifications are all contemplated within the scope of the present disclosure.

In addition, although not expressly specified above, one or more steps of the method 200 may include a storing, displaying and/or outputting step as required for a particular application. In other words, any data, records, fields, and/or intermediate results discussed in the method(s) can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 3 depicts a high-level block diagram of a computing device or processing system specifically programmed to perform the functions described herein. For example, any one or more components or devices illustrated in FIG. 1 or described in connection with the method 200 may be implemented as the processing system 300. As depicted in FIG. 3, the processing system 300 comprises one or more hardware processor elements 302 (e.g., a microprocessor, a central processing unit (CPU) and the like), a memory 304, (e.g., random access memory (RAM), read only memory (ROM), a disk drive, an optical drive, a magnetic drive, and/or a Universal Serial Bus (USB) drive), a module 305 for establishing a communication session between a user device and an enterprise system using an access credential stored in an access credential locker that is decrypted in accordance with a first key obtained from the user device and a second key obtained from the enterprise, and various input/output devices 306, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for establishing a communication session between a user device and an enterprise system using an access credential stored in an access credential locker that is decrypted in accordance with a first key obtained from the user device and a second key obtained from the enterprise (e.g., a software program comprising computer-executable instructions) can be loaded into memory 304 and executed by hardware processor element 302 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for establishing a communication session between a user device and an enterprise system using an access credential stored in an access credential locker that is decrypted in accordance with a first key obtained from the user device and a second key obtained from the enterprise (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
obtaining, by a processing system, a request from a user device to activate an access credential locker associated with a user of the user device for use in accessing at least one enterprise system of an enterprise via the processing system, wherein the request comprises a token that identifies the access credential locker, wherein the processing system is distinct from the user device and from the at least one enterprise system;
obtaining, by the processing system, a first key from the user device;
transmitting, by the processing system to the enterprise, a request for a second key;
obtaining, by the processing system, the second key from the enterprise in response to the request for the second key;
applying, by the processing system, the first key and the second key to the access credential locker, wherein the access credential locker is encrypted in accordance with the first key and the second key, wherein the access credential locker is decrypted via the applying of the first key and the second key; and
establishing, by the processing system, a communication session between the user device and the at least one enterprise system, wherein the communication session is routed via the processing system using at least one access credential that is stored in the access credential locker that is decrypted.

2. The method of claim 1, further comprising:
retrieving the access credential locker from a storage location in accordance with the token.

3. The method of claim 1, further comprising:
obtaining an access request from the user device to access the at least one enterprise system.

4. The method of claim 3, wherein the establishing of the communication session between the user device and the at least one enterprise system is responsive to the access request.

5. The method of claim 1, wherein the at least one enterprise system is deployed on an infrastructure of at least one cloud computing service provider network.

6. The method of claim 1, wherein the at least one enterprise system comprises a plurality of enterprise systems of the enterprise deployed on a plurality of infrastructures of a plurality of cloud computing service provider networks.

7. The method of claim 6, wherein a plurality of access credentials is stored in the access credential locker.

8. The method of claim 7, wherein the establishing of the communication session between the user device and the at least one enterprise system comprises establishing a plurality of communication sessions between the user device and the plurality of enterprise systems using the plurality of access credentials.

9. The method of claim 1, wherein the request for the second key includes an identification of at least one of: the user or the user device.

10. The method of claim 9, wherein the enterprise provides the second key when the at least one of: the user or the user device is authorized to use the at least one access credential.

11. The method of claim 1, wherein the processing system comprises:
a first infrastructure of a first cloud computing service provider network;
a second infrastructure of an internet exchange point; or
a secure access service edge.

12. The method of claim 11, wherein the at least one enterprise system is deployed on:
a third infrastructure of the first cloud computing service provider network;
a fourth infrastructure of a second cloud computing service provider network; or
a fifth infrastructure of an enterprise network of the enterprise.

13. The method of claim 1, further comprising at least one of:
obtaining an indicator that the user device is finished with an access to the at least one enterprise system; or
reaching an end of a time period for which the access to the at least one enterprise system is permitted.

14. The method of claim 13, further comprising:
encrypting the access credential locker using a third key and a fourth key.

15. The method of claim 14, further comprising:
obtaining the third key from the user device; and
obtaining the fourth key from the enterprise.

16. The method of claim 14, further comprising:
providing the third key or a first code via which the third key is reconstructable to the user device; and
providing the fourth key to the enterprise.

17. The method of claim 16, wherein the third key is reconstructable from the first code in combination with a second code obtained via a companion system that is external to the processing system.

18. The method of claim 17, wherein the companion system comprises a cellular telephone of the user or a cellular base station.

19. A non-transitory computer-readable medium storing instructions that when executed by a processing system including at least one processor, cause the processing system to perform operations, the operations comprising:
obtaining a request from a user device to activate an access credential locker associated with a user of the user device for use in accessing at least one enterprise system of an enterprise via the processing system, wherein the request comprises a token that identifies the access credential locker, wherein the processing system is distinct from the user device and from the at least one enterprise system;
obtaining a first key from the user device;
transmitting, to the enterprise, a request for a second key;
obtaining the second key from the enterprise in response to the request for the second key;
applying the first key and the second key to the access credential locker, wherein the access credential locker is encrypted in accordance with the first key and the second key, wherein the access credential locker is decrypted via the applying of the first key and the second key; and
establishing a communication session between the user device and the at least one enterprise system, wherein the communication session is routed via the processing system using at least one access credential that is stored in the access credential locker that is decrypted.

20. An apparatus comprising:
a processing system including at least one processor; and
a non-transitory computer-readable medium storing instructions that when executed by the processing system, cause the processing system to perform operations, the operations comprising:
obtaining a request from a user device to activate an access credential locker associated with a user of the user device for use in accessing at least one enterprise system of an enterprise via the processing system, wherein the request comprises a token that identifies the access credential locker, wherein the processing system is distinct from the user device and from the at least one enterprise system;
obtaining a first key from the user device;
transmitting, to the enterprise, a request for a second key;
obtaining the second key from the enterprise in response to the request for the second key;
applying the first key and the second key to the access credential locker, wherein the access credential locker is encrypted in accordance with the first key and the second key, wherein the access credential locker is decrypted via the applying of the first key and the second key; and
establishing a communication session between the user device and the at least one enterprise system, wherein the communication session is routed via the processing system using at least one access credential that is stored in the access credential locker that is decrypted.

* * * * *